United States Patent [19]
Briggs et al.

[11] Patent Number: 5,905,607
[45] Date of Patent: May 18, 1999

[54] RETURN PATH GEOMETRY TO ENHANCE UNIFORMITY OF FORCE ON A LINEAR ACTUATOR

[75] Inventors: John C. Briggs, Layton, Utah; Ken G. Wasson, Foster City, Calif.

[73] Assignee: Iomega Corporation, Roy, Utah

[21] Appl. No.: 08/881,807

[22] Filed: May 30, 1997

[51] Int. Cl.$^6$ .............................. G11B 5/55; G11B 21/08
[52] U.S. Cl. ............................................................ 360/106
[58] Field of Search .............................. 360/106; 310/12, 310/13

[56] References Cited

U.S. PATENT DOCUMENTS

| | | | |
|---|---|---|---|
| 4,504,879 | 3/1985 | Toldi et al. | 360/105 |
| 4,663,677 | 5/1987 | Griffith et al. | 360/71 |
| 4,663,682 | 5/1987 | McNeil | 360/105 |
| 4,683,506 | 7/1987 | Toldi et al. | 360/105 |
| 4,722,012 | 1/1988 | Toldi et al. | 360/97 |
| 4,740,851 | 4/1988 | Jones et al. | 360/97 |
| 4,787,000 | 11/1988 | Schulze | 360/105 |
| 4,811,143 | 3/1989 | Ohashi et al. | 360/105 |
| 4,901,173 | 2/1990 | Jones et al. | 360/99.04 |
| 4,965,685 | 10/1990 | Thompson et al. | 360/97.01 |
| 5,027,241 | 6/1991 | Hatch et al. | 360/105 |
| 5,291,359 | 3/1994 | Wolter | 360/104 |
| 5,442,505 | 8/1995 | Forbord | 360/106 |
| 5,504,636 | 4/1996 | Yuki et al. | 360/106 |
| 5,508,864 | 4/1996 | Briggs et al. | 360/106 |
| 5,530,607 | 6/1996 | Spendlove | 360/105 |

*Primary Examiner*—Robert S. Tupper
*Attorney, Agent, or Firm*—Woodcock Washburn Kurtz Mackiewicz & Norris LLP

[57] ABSTRACT

Narrow gaps near the end of travel of a linear actuator coil of a magnetic disk drive is disclosed. The gaps are formed between actuator magnets and inner return path members on opposing sides of an actuator carriage. The narrow gaps are formed by protrusions on the inner return path members that extend into the gaps. The narrow gaps enhance uniformity of force applied to the carriage by diminishing the end effects, which enables the entire length of the air gap to be used for actuator travel.

5 Claims, 4 Drawing Sheets

RETURN PATH GEOMETRY TO ENHANCE UNIFORMITY OF FORCE ON A LINEAR ACTUATOR

FIELD OF THE INVENTION

The present invention relates to disk drives for storing digital information, and more particularly, to linear actuators within disk drives.

DESCRIPTION OF THE PRIOR ART

Disk drives for storing electronic information are found in a wide variety of computer systems, including workstations, personal computers, and laptop and notebook computers. Such disk drives can be stand-alone units that are connected to a computer system by cable, or they can be internal units that occupy a slot or bay in the computer system. Laptop and notebook computers have relatively small bays in which to mount internal disk drives and other peripheral devices, as compared to the much larger bays available in most workstation and personal computer housings. The relatively small size of peripheral bays found in laptop and notebook computers can place significant constraints on the designer of internal disk drives for use in such computers. Techniques that address and overcome the problems associated with these size constraints are therefore important.

Disk drives of the type that accept removable disk cartridges have become increasingly popular. One disk drive product that has been very successful is the ZIP™ drive designed and manufactured by Iomega Corporation, the assignee of the present invention. ZIP™ drives accept removable disk cartridges that contain a flexible magnetic storage medium upon which information can be written and read. The disk-shaped storage medium is mounted on a hub that rotates freely within the cartridge. A spindle motor within the ZIP™ drive engages the cartridge hub when the cartridge is inserted into the drive, in order to rotate the storage medium at relatively high speeds. A shutter on the front edge of the cartridge is moved to the side during insertion into the drive, thereby exposing an opening through which the read/write heads of the drive move to access the recording surfaces of the rotating storage medium. The shutter covers the head access opening when the cartridge is outside of the drive to prevent dust and other contaminants from entering the cartridge and settling on the recording surfaces of the storage medium.

The ZIP™ drive is presently available for workstations and personal computers in both stand-alone and internal configurations. In order to provide a version of the ZIP™ drive for use in laptop and notebook computers, the size constraints of the peripheral bays of such computers must be considered. In particular, for an internal drive to fit in the majority of laptop and notebook peripheral bays, the drive must be no longer than 135 mm. The height of the drive must be in the range of 12 mm to 15 mm. These dimensions place many constraints on the design of such a drive, and give rise to numerous design problems. The present invention addresses and overcomes one such problem.

Disk drives, for example the ZIP™ drive, often include an actuator assembly to carry read/write heads into engagement with an information storage disk. One type of actuator is a linear actuator that includes a coil mounted to a carriage, a magnetic flux outer return path assembly, two inner return path assembly members, and two actuator magnets that are typically bonded to opposing inner walls of the outer return path. The inner and outer return paths form a flux return path for a magnetic field generated by the magnets. The magnetic flux within the air gap between the magnets and the inner return paths induces a force F on the actuator in response to an electric current in the actuator coil, thereby moving the carriage.

According to the well known principles developed by Faraday and Biot Savart, in a device where electric current is flowing orthogonal to the direction of magnetic flux in an air-gap, such as in a voice coil motor, the force F is the product of Bgap times L times i. Bgap is the field amplitude in the air gap in terms of flux density, L is the active length of current-carrying conductors in that air gap and i is the amplitude of current in those conductors. A coil consisting of a plurality of conductors wound along the direction of travel will necessarily interact, when energized, with the average of the magnetic field in the air-gap along the axial length of the coil.

Unfortunately, the force generated on the actuator by the magnets and coil substantially diminishes near the ends of the air gap. Curve 6 of FIG. 4 is an illustration of the diminishing force F that is applied to the carriage near the ends of the gaps. The term D represents the distance from the end of the air gap. The ordinate of FIG. 4 represents the air gap end. These end effects may possibly be due to loss of perpendicularity of the magnetic flux (relative to the magnet) near the end of the gaps. Regardless of the phenomenon responsible for the end effects, conventional full-size actuator assemblies typically allow for the end effects by limiting the travel of the carriage to the area within the air gap where end effects are minimal. Such limitation on carriage travel requires a longer outer return path to provide the longer air gap.

This solution to the end effect problem is feasible in full-size drives because such drives lack a constraint on overall length. However, in laptop and notebook computers such ineffective use of space is problematic. It is desirable to provide a linear actuator for a disk drive that enables the carriage to utilize a greater portion of the air gap.

The linear actuator has a related magnetic problem that is also exasperated by the trend toward smaller disk drives. Magnetic flux from the magnets cannot be confined to a given location or magnetic path because a portion of the flux naturally takes paths that are external to the magnet. The portion of the flux that leaks from the desired paths is referred to as leakage or leakage flux. Magnetic leakage is troublesome in magnetic disk drives because the leakage may interfere with the recording or reading of the information, or may even cause bulk erasure of magnetic information.

To ensure proper operation, it is desirable to maintain a magnetic leakage flux limit of approximately 10 Gauss in the area where the heads access the magnetic information. Conventional disk drives, in which overall drive length is not tightly constrained, may reach such a low level of leakage flux in the area of the magnetic information by locating the magnets far away from the disk and locating the read/write heads at the end of long actuator arms.

Because of the reduced drive length compared with larger drives, a linear actuator of laptop and notebook computer drives must be positioned significantly closer to the magnetic information on the disk. Because the magnets are affixed within the linear actuator, the magnets of these smaller drives must also be closer to the magnetic information. It is desirable to provide a device that diminishes the leakage flux from the actuator magnets in the area of the magnetic information on a magnetic disk, especially in smaller disk drives such as those of laptop and notebook computers.

The foregoing and other objects, features and advantages of the invention will become evident hereinafter.

SUMMARY

The present invention is directed to a disk drive having a return path geometry that enhances the uniformity of force applied to a linear actuator carriage near the ends of its travel. The return path geometry forms a gap, through which the carriage coil travels, that defines a gap narrow portion on each end. The gap narrow portion provides increased force to be generated on the carriage at the ends of the gap. Such an increase in force counteracts the typical decrease in force (compared with a gap middle portion) present at the ends of the gap.

As the actuator travels closer to the end of the gap within the narrow gap portion, the force generated on the carriage decreases. Preferably, throughout most of the gap narrow portion, the narrow gap provides an increase in force above the force generated at the gap middle portion. At the end of the gap, the force preferably is near or just below the force generated at the gap middle portion far from end effects.

By employing the present invention to keep the force from diminishing much below the force generated near the gap middle portion, most of the length, or even the entire length, of the gap may be used for carriage travel. Because the present invention permits the carriage to travel to the ends of the gaps, the length required for the linear actuator may be reduced.

BRIEF DESCRIPTION OF THE FIGURES

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings.

DETAILED DESCRIPTION OF THE PREFERRED EMBODIMENT

Figure 1:
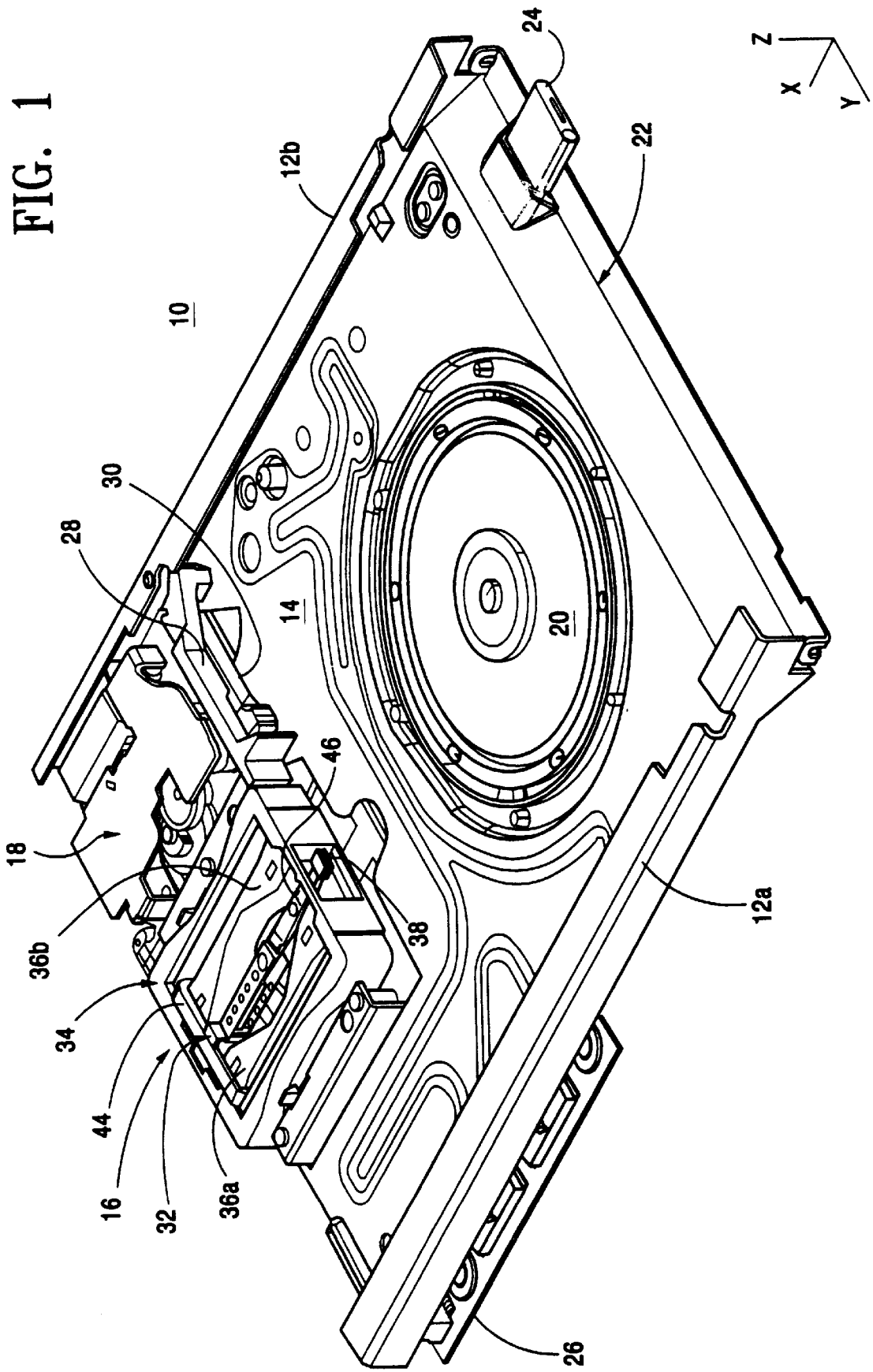
FIG. 1 shows an exemplary disk drive in which a return path employing the present invention may be employed.

FIG. 1 shows an exemplary disk drive 10 in which the present invention may be employed. The disk drive 10 comprises a chassis 14 having u-shaped outer edges that form opposed guide rails 12a, 12b that guide a removable disk cartridge (not shown) into the disk drive through opening 22. In the present embodiment, the chassis is metallic. A thin metal top cover (not shown) of the disk drive 10 has been removed so that the internal components of the drive are visible.

A cartridge shutter lever 28 and an eject lever 30 are rotatably mounted on the chassis. Both levers 28 and 30 are shown in FIG. 1 in the positions that they occupy when a disk cartridge is fully inserted into the drive. During cartridge insertion, the shutter lever swings from a forward position to the position shown in FIG. 1. During this movement, an abutment surface on the shutter lever 28 engages a shutter of the disk cartridge and moves the shutter to the side, exposing a head access opening in the front peripheral edge of the cartridge. The eject lever also moves from a forward position to the position shown in FIG. 1, when the cartridge is inserted. In the position shown in FIG. 1, the eject lever is in a cocked position, under spring tension. When it is desired to eject the disk cartridge from the drive 10, an eject button 24 is pushed. Among other things, this causes the eject lever 30 to be released from its cocked position, so that it springs forward to force the disk cartridge backwardly out of the disk drive.

The disk drive 10 also has a linear actuator 16 disposed at the rear of the chassis 14. The linear actuator 16 comprises a carriage assembly 32, an outer magnet return path assembly 34, and a first and a second inner return path member 36a and 36b disposed on opposite sides of the carriage assembly 32. Carriage assembly 32 includes a coil 44 and actuator arms 46, and read/write heads 38 that are disposed on a front end of actuator arms 46.

After a disk cartridge is inserted into the disk drive 10, the carriage assembly 32 carries a pair of read/write heads 38 over the recording surfaces of a disk-shaped storage medium within the cartridge. A spindle motor 20 is provided on the floor of the chassis 14. During cartridge insertion, the spindle motor 20 is translated vertically into engagement with a hub of the disk cartridge, in order to rotate the disk-shaped storage medium at a relatively high speed. A circuit board 26 is attached to the chassis 14 via a plurality of standoffs (not shown). The circuit board 26 carries the drive circuitry. A gear train mechanism 18 controls movement of the eject lever 30 and movement of a head retract mechanism (not shown) that moves the carriage assembly 32 to a parked position to prevent damage to the read/write heads 38, when the disk drive is not in use.

Figure 2:
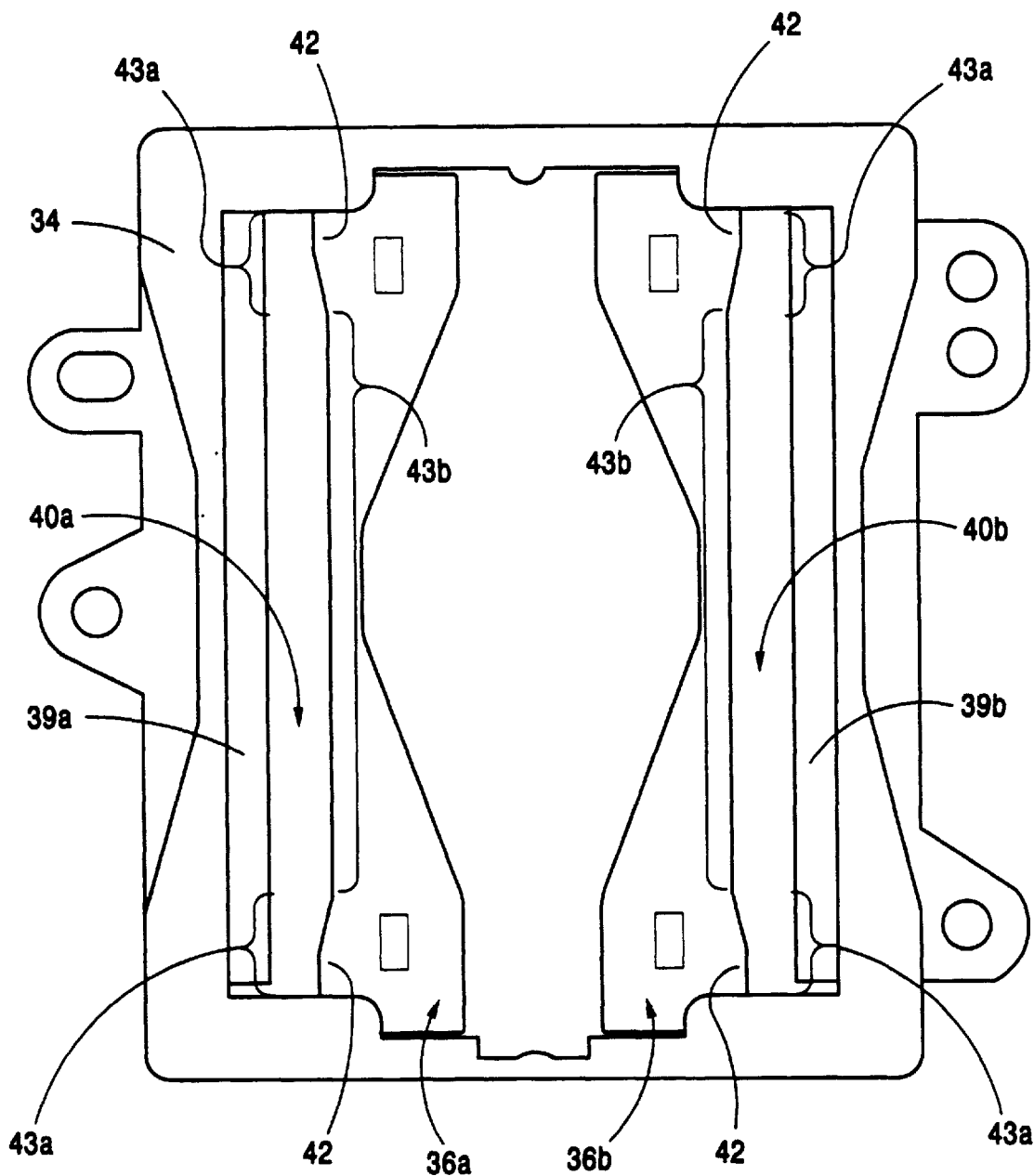
FIG. 2 shows a top view of the return path according to the present invention.
Figure 3:
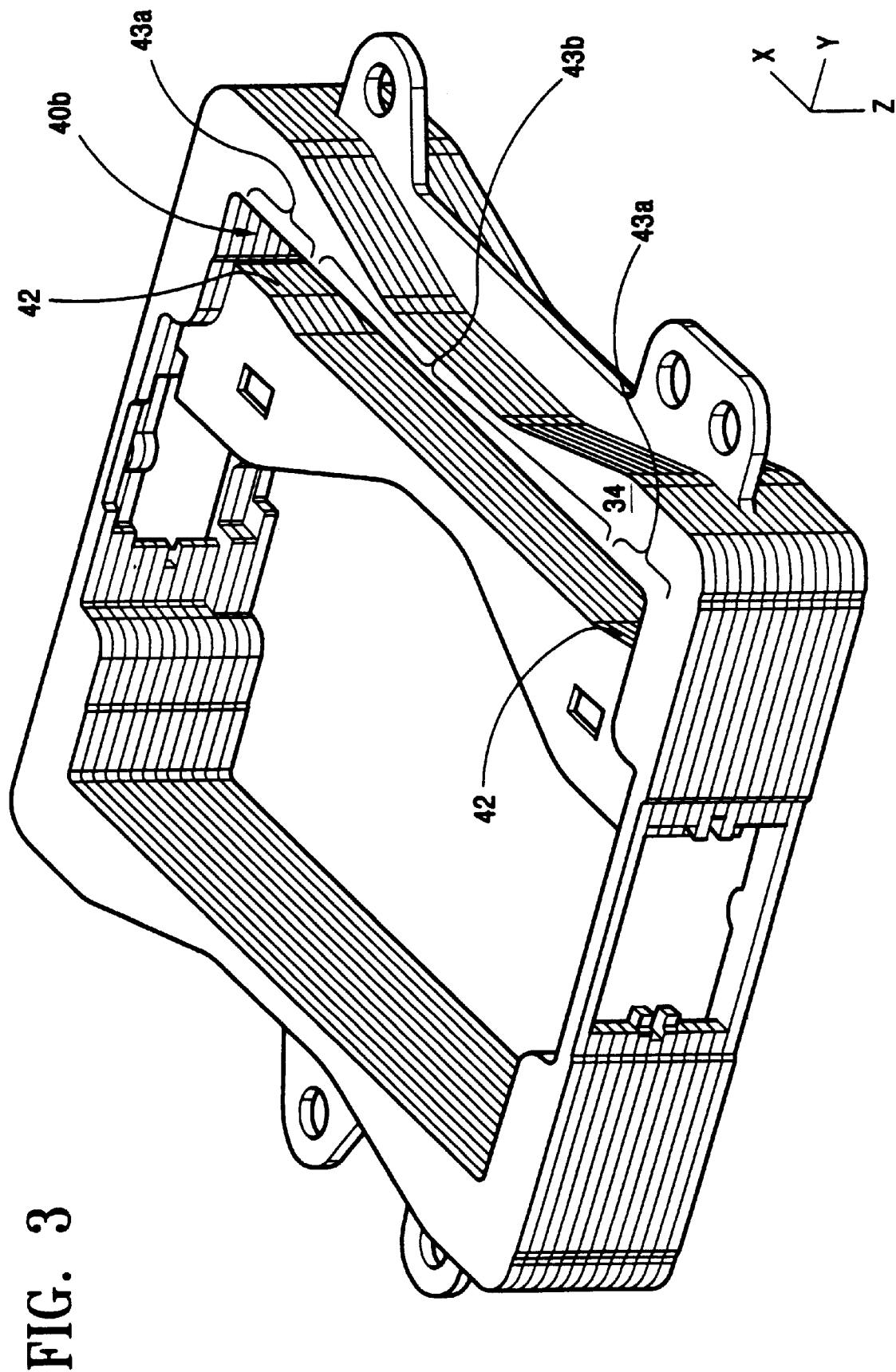
FIG. 3 shows a perspective view of the return path according to the present invention with one of the inner return path members removed for clarity.

Referring to FIGS. 1, 2, and 3 outer return path 34, which preferably forms a substantially rectangular shape (viewed from above), includes a pair of actuator magnets 39a,b. A first and second actuator magnet 39a and 39b, respectively, are coupled to opposing vertical interior sides of outer return path 34 substantially parallel to a longitudinal centerline of the actuator arms 46. First and second inner return path members 36a and 36b span from a front to a rear side of outer return path 34. Co-pending application Serial U.S. application Ser. No. 08/881,805, filed May 30, 1997, entitled "Laminated Steel Return Path with Actuator Support Features" which is incorporated herein by reference in its entirety, describes the outer return path 34 and inner return path members 36a and 36b.

Inner return path members 36a and 36b have an outboard surface that faces actuator magnets 39a and 39b, respectively, to form a respective air gap 40a and 40b. Each one of the inner return path members 36a and 36b have a protruding portion 42 that faces the respective magnet 39a and 39b. Because the magnets 39a and 39b preferably are substantially flat throughout their length, protruding portions 42 create a narrow gap portion 43a at the end of each gap 40a and 40b. The portions of the gap that is not proximate to protrusions 42 define a gap middle portion 43b. Thus, each gap 40a and 40b comprises a gap middle portion 43b, and a gap narrow portion 43a at each end.

Preferably, the gap 40a,b is approximately 29.5 mm long and approximately 1.75 mm wide (between the exposed surface of actuator magnet 39a,b and the outer surface of inner return path members 36a,b) at the gap middle portion 43b. Each protrusion 42 extends from the outer surface at each end of inner return path member 36a,b by approximately 0.40 mm, thereby forming the narrow gap portion 43a that is 1.35 mm wide. The narrow gap potion 43a on each end is approximately 4.369 mm long, including a straight portion that is approximately 2.395 mm long and an oblique transition portion between the straight portion and gap middle portion 43b that is approximately 1.974 mm long. Gap middle portion 43b is approximately 20.762 mm long. Although the entire length of gap 40a,b is 29.5 mm long, actuator magnets 39a,b are slightly shorter, for example 29.0 mm long, to provide clearance. The length of the outer return path (outside dimension) preferably is 35.5 mm.

According to the present invention, the force F applied to the carriage 32 near the ends of travel is enhanced by the gap narrow portions 43a. Within gap narrow portions 43a, the Bgap term is increased because of the smaller gap dimension compared with gap middle portion 43b. Therefore, the value of force F is increased according to the Biot-Savart principle F=Bgap×L×i.

Figure 4:
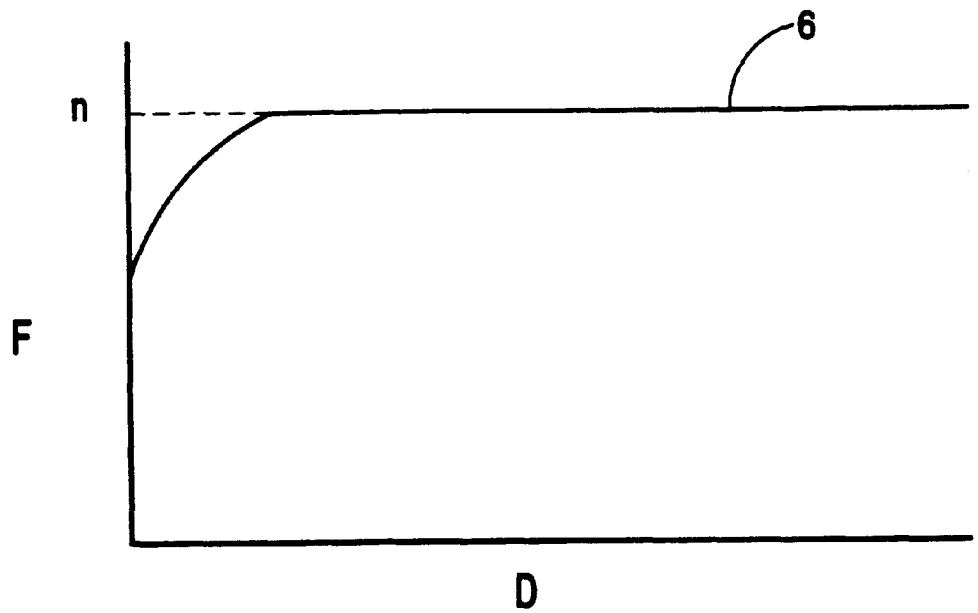
FIG. 4 (Prior Art) is graph illustrating end effects of conventional devices.
Figure 5:
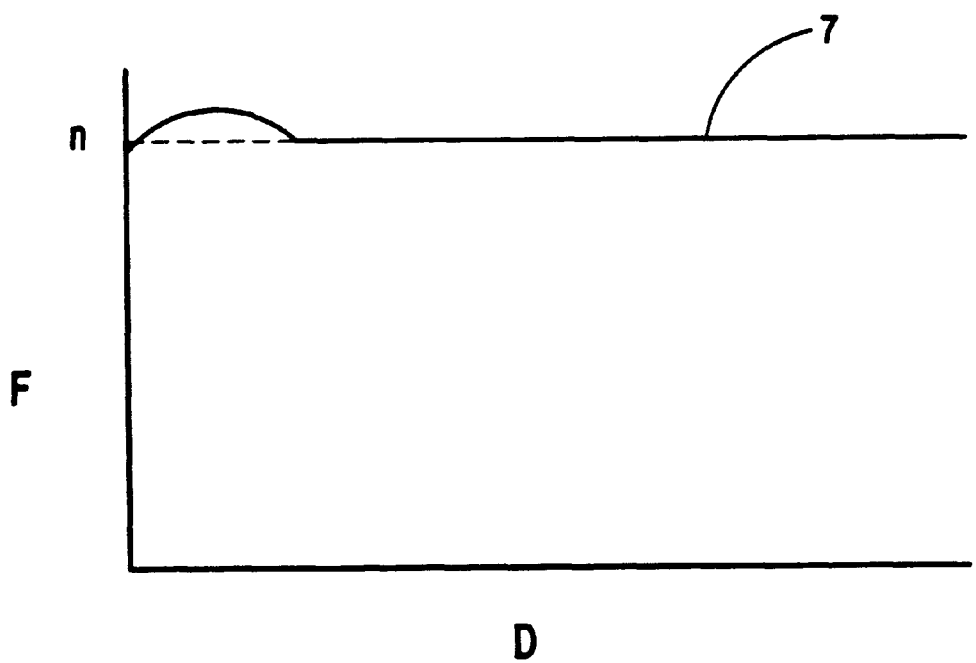
FIG. 5 is a graph illustrating enhanced force uniformity near the end of actuator travel when employing the present invention.

Curve 7 of FIG. 5 is an illustration of the improved force characteristics of the narrow gap portion 43a (compared with the end effects illustrated in prior art FIG. 4). The force that is applied to the carriage 32 is referred to as F, the distance measured from the end of the gap 40a,b is termed D, and the force F applied to carriage 32 away from the ends of gap 40a,b is termed n. Following curve 7 from right to left (toward the ordinate), which corresponds to moving from the gap middle portion toward the end of the gap 40a,b mark the outer return path, the force F increases as gap 40a,b begins to narrow because of the oblique transition portion of protrusion 42 (that is, as the carriage nears gap narrow portion 43a). Further following curve 7 toward the ordinate, force F continues to increase until it begins to decrease because of end effects. Preferably, the geometry of narrow gap 43a produces a force F at the ordinate, which corresponds to force on the carriage at the end of gap 40a,b (where it reaches the front or rear portion of outer return path 34), that is equal to or slightly less than force n.

By keeping force F near the force n because of the present inventive narrow gap portion, a greater portion of the length, or even the entire length, of gap 40a,b may be used for travel of carriage 32. Because employing the present invention permits such travel, the length required for the linear actuator may be reduced.

Although this description provides dimensions of a preferred embodiment, the present invention encompasses other dimensions according to the inventive principles herein. The actual gap dimension for other applications that diminishes the end effects will vary according to several physical parameters of the actual application, including for example the dimensions of the gap middle portion 43b, the gap length and height, the strength of actuator magnets 39a and 39b, the size and range of current of coil 44, and the magnetic permeability of the components. The design of these parameters with respect to employing the present invention will be understood by those who are familiar with the actual application.

It is further understood that changes may be made to the embodiments described above without departing from the broad inventive concepts thereof. Accordingly, the present invention is not limited to the particular embodiments disclosed, but is intended to cover all modifications that are within the spirit and scope of the invention as defined by the appended claims.

What is claimed is:

1. A disk drive comprising a linear actuator having:

a magnetic flux outer return path;

a pair of actuator magnets coupled to the outer return path;

two inner return path members coupled to the outer return path, each one of the two inner return paths spaced apart from a corresponding one of the actuator magnets; and two gaps, a first one of said two gaps formed between one of the two inner return paths and one of the two actuator magnets, a second one of said two gaps formed between an other one of the two inner return paths and an other one of the two actuator magnets, each one of said two gaps including a middle portion comprising a gap uniform thickness portion and at least one end portion comprising a gap narrow portion for diminishing end effects that reduce force applied to an actuator carriage.

2. The linear actuator of claim 1 wherein the at least one end portion comprises two end portions disposed on opposing ends of each one of the two gaps.

3. The linear actuator of claim 1 wherein each one of the inner return path members has a protruding portion on at least one end, said protruding portion extending into the gap and forming said gap narrow portion therein.

4. The linear actuator of claim 2 wherein each one of the two inner return path members has two protruding portions, each one of the two protruding portions disposed on an opposing end of the inner return path member, each one of said protruding portions extending into the gap and forming said gap narrow portions thereby.

5. The linear actuator of claim 1 wherein the outer return path substantially forms a rectangular shape, each one of the two inner return path members coupled to a front side and to a rear side of the outer return path and spanning therebetween, each one of the two actuator magnets coupled to opposing sides of the outer return path.

* * * * *

UNITED STATES PATENT AND TRADEMARK OFFICE
CERTIFICATE OF CORRECTION

PATENT NO. : 5,905,607
DATED : May 18, 1999
INVENTOR(S) : John C. Briggs and Ken Wasson It is certified that error appears in the above-identified patent and that said Letters Patent is hereby corrected as shown below:

Column 4, lines 48-53,
after "34." should read U.S. Patent 5,478,410, entitled "Slotted Flex Circuit For A Disk Drive Actuator," and co-pending U.S. Application Serial No. 08/881,805, filed May 30, 1997, entitled "Laminated Steel Return Path with Actuator Support Features," which are incorporated herein by reference in their entirety, describe the outer return path 34 and inner return path members 36a and 36b.

Column 5, line 6- the word "potion" should be typed as "portion"

Signed and Sealed this
First Day of February, 2000

*Attest:*

*Attesting Officer*

Q. TODD DICKINSON
*Acting Commissioner of Patents and Trademarks*